United States Patent

[11] 3,604,806

[72] Inventor John David Redman
Newbury, England

[21] Appl. No. 766,185
[22] Filed Oct. 9, 1968
[45] Patented Sept. 14, 1971
[73] Assignee United Kingdom Atomic Energy Authority
London, England

[54] PATTERN CLASSIFICATION APPARATUS
2 Claims, 9 Drawing Figs.

[52] U.S. Cl. .......... 356/71, 250/219, 250/233
[51] Int. Cl. .......... G06k 9/08
[50] Field of Search .......... 356/71, 106; 250/219, 233

[56] References Cited

UNITED STATES PATENTS

| | | | |
|---|---|---|---|
| 3,200,701 | 8/1965 | White .......... | 356/71 X |
| 3,305,834 | 2/1967 | Cooper et al. .......... | 356/71 X |
| 3,424,512 | 1/1969 | Ingalls .......... | 356/71 X |
| 3,453,596 | 7/1969 | Hawkins .......... | 356/71 X |
| 3,240,108 | 3/1966 | Lehan et al. .......... | 356/106 |

OTHER REFERENCES

Horvath, V. V., et al. " Holographic Technique Recognizes Fingerprints." An article in Laser Focus, vol. 3, No. 11, June 1967. p. 18–23.

*Primary Examiner*—Ronald L. Wibert
*Assistant Examiner*—T. Major
*Attorney*—Larson, Taylor and Hinds

ABSTRACT: The apparatus uses a beam of collimated light, e.g. from a laser, to produce a diffraction image of the pattern, e.g. a transparent fingerprint. This image is effectively scanned, either mechanically by a light filter or filters which rotate relative to the image, in which case the transmitted light is converted to a cyclically varying electrical signal which can be frequency analyzed into components characteristic of the pattern, or statically by concentric arrays of photosensitive devices whose DC outputs are characteristic of the spatial frequencies of the pattern.

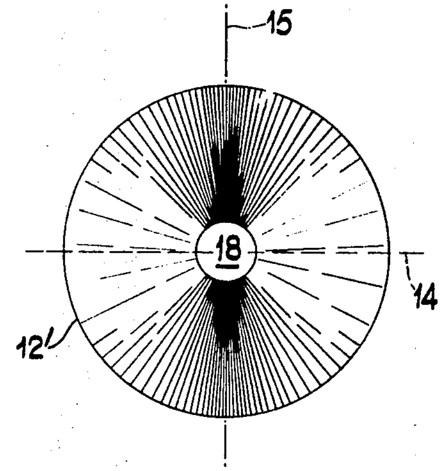
FIG.(4a.)
FIG.(4b.)
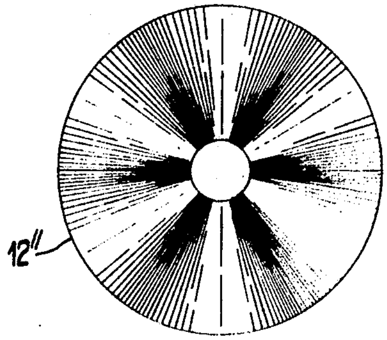
FIG.5
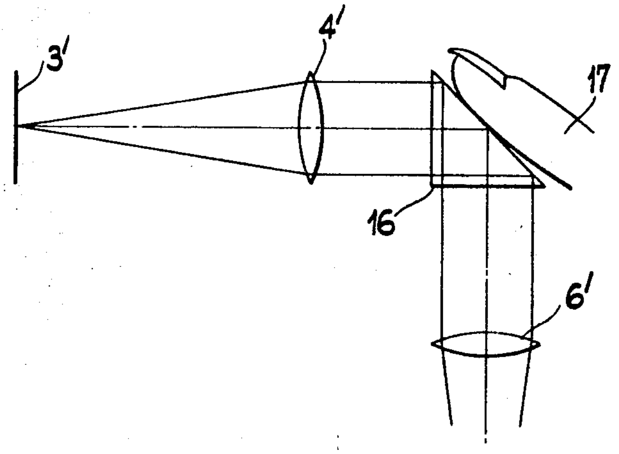

PATTERN CLASSIFICATION APPARATUS

CROSS-REFERENCE TO RELATED APPLICATION

This application is an extension of the subject-matter of application Ser. No. 633,809, filed 26th Apr. 1967 by C. D. Reid, and has the same assignee.

This invention relates to apparatus for classifying patterns having well defined edges separating areas of different tones, particularly those in which lines of approximately constant width occur or in which a series of parallel forms or geometrical shapes can be observed, and has one application in classifying fingerprints.

According to the present invention apparatus for pattern classification comprises means for providing a beam of collimated light, means for locating the pattern relative to said beam to produce a diffraction image from the pattern, and means for deriving from said image electrical signals corresponding to the variation of illumination over at least a portion of said image.

The signal-deriving means may comprise means for cyclically scanning the diffraction image with a filter having at least one light-transmitting portion, and means for converting the light transmitted from the image through said portion into a cyclically varying electrical signal. Means may be provided for analyzing the frequency content of said signal. Preferably said analyzing means is adapted to determine the relative amplitudes of selected frequencies in said signal.

The scanning may be circumferential or radial relative to the axis of the image. For circumferential scanning the filter may comprise at least one light-transmitting slit arranged radially relative to the axis of the diffraction image and rotatable relative to said image about said axis. Preferably two colinear radial slits are provided.

Alternatively the filter may be adapted to have uniform light transmission along any radius relative to the axis of the diffraction image but sinusoidally varying light transmission around any circumference relative to said axis and to be rotatable about said axis relative to said image.

For radial scanning the filter may comprise an annular light-transmitting slit arranged concentrically with the image and whose diameter is controllable to scan the image in the radial direction. Alternatively the filter may comprise a plurality of annular light-transmitting slits of increasing but fixed diameter arranged concentrically with the image axis, and means for causing light from the image to be transmitted by each successive slit. Again, a fixed annular slit may be used and the effective magnification of the diffraction image varied cyclically so that an annular part of the image is effectively swept over the slit.

As an alternative to the provision of scanning means, there may be provided at least one ring of photosensitive devices concentric with the axis of the diffraction image projected thereon, and means for combing the DC outputs from the devices in selected sectors of said ring to produce in output corresponding to the amplitude of at least one selected spatial frequency in the annular portion of the image which is superimposed on said ring.

To enable the nature of the present invention to be more readily understood, attention is directed, by way of example, to the accompanying drawings, wherein.

FIGS. 4 ( *a* ) and 4 (*b* ) are plan views of alternative forms of scanning filter.

FIG. 5 is a schematic diagram of modified apparatus for obtaining a diffraction image of a fingerprint.

Figure 6:
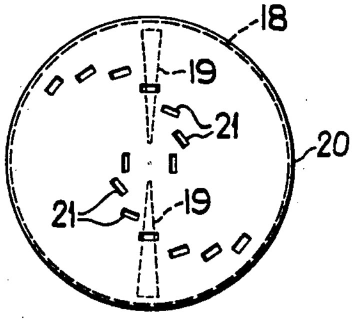

FIG. 6 is a plan view of a scanning filter having windows at a variable radius.

Figure 7:
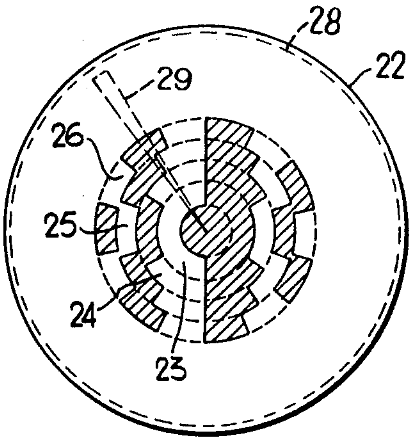

FIG. 7 is a plan view of a superimposable filter for determining the light content of different narrow annuli of the image.

Figure 8:
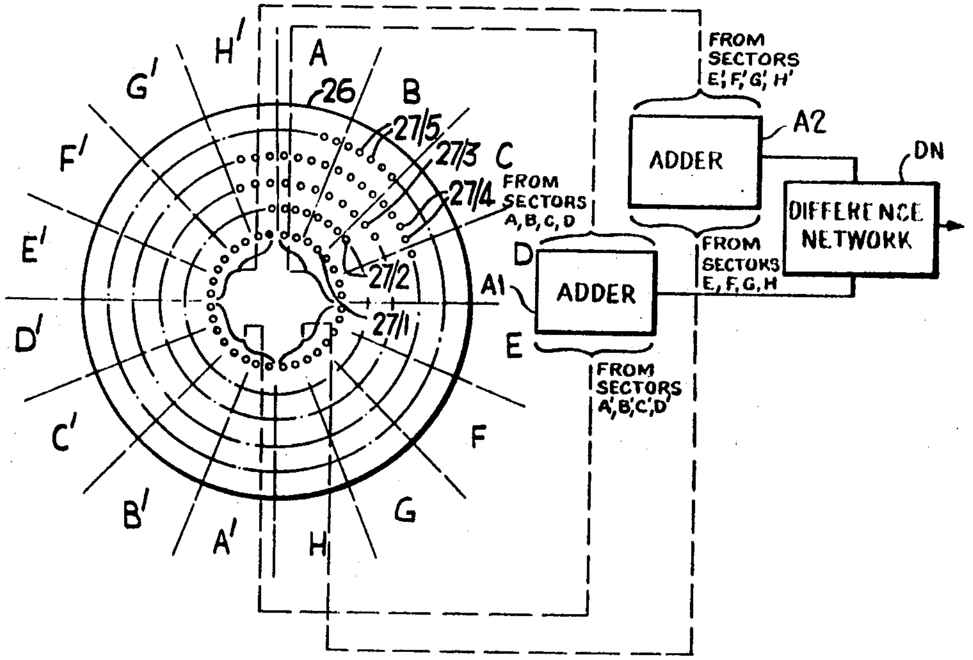

FIG. 8 is a plan view of a static photoelectric array for determining spatial frequencies in different narrow annuli of the image.

Figure 1:
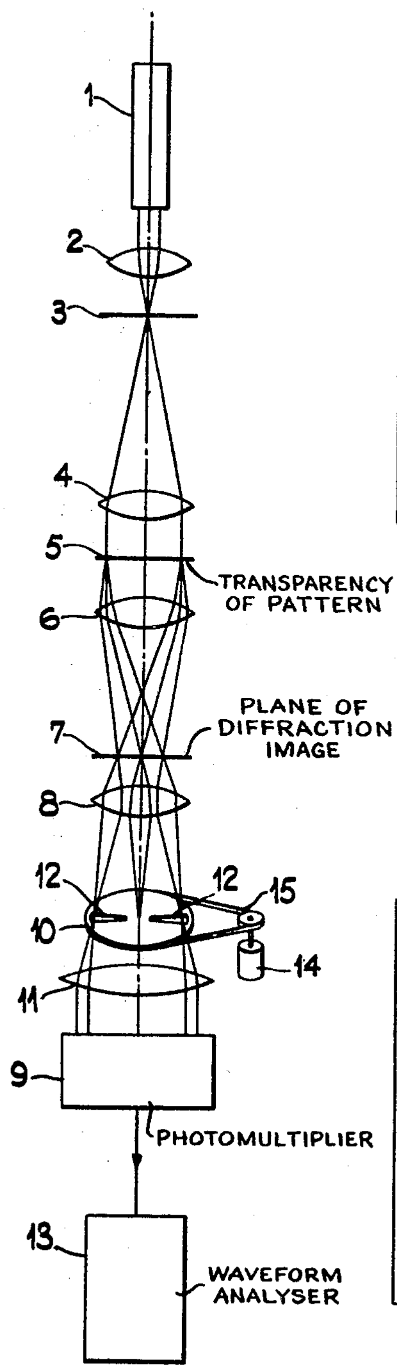
FIG. 1 is a semischematic diagram of apparatus embodying the present invention.

The apparatus shown in FIG. 1 comprises a helium-neon gas laser light-source 1 whose output is focused by a converging lens 2 on to a pinhole 3 to ensure complete coherence and apodisation (i.e. suppression of high-order diffraction) of the light. The use of a laser light source is not essential but is preferred as it gives more intense illumination. A laser providing a continuous (nonpulsed) output of 10 m. optical power at 6,328 A. and a beam diameter of about ¼inch is suitable. A collimating lens 4 renders the light parallel before passing through a transparency 5 of the pattern to be classified. The light leaving the transparency is refocussed by a lens 6 to produce an image 7 in the plane where an image of pinhole 3 would appear in the absence of transparency 5. With transparency 5 present, image 7 is a diffraction image (also known as a Fourier transform) formed by the pattern. Lenses 4 and 6 are both first-quality telescope objectives, suitably having focal lengths of about 40 inches and spaced about 9 inches apart with the transparency spaced about halfway between them. These spacings are not critical.

The size and distribution of the light patches in the diffraction image are dependent on the relative spacings and orientations of the edges within the pattern. The zero-order (central) image contains little more than information about the overall shape of the pattern and can be neglected without appreciable loss of information. The integrated intensity of light along any diameter of the image, excluding the zero-order light, is determined by the lengths of edge in the pattern at right angles to that diameter. The radial distribution of light along a diameter is determined by the relative arrangement and spacings of the edges transformed on that diameter.

Returning to FIG. 1, the image 7 is enlarged and projected by a lens 8 onto a photomultiplier detector 9 via a scanning disc 10 and a collecting lens 11. Suitably the lens 8 produces an image at disc 10 which is enlarged approximately $x12$ relative to the image obtained at 7. The disc 10 is rotatable in a circumferential bearing (omitted for clarity) by means of a constant-speed electric motor 14 and belt drive 15. The photomultiplier 9 is provided with a red filter (not shown) to preferentially accept the laser light, and with a diffusing screen (not shown) to spread the transmitted light over the photomultiplier cathode surface and so reduce the effect of nonuniformities in the surface.

The above-described components are mounted on a conventional rigid optical bench, which is itself mounted on antivibration mountings.

Figure 2:
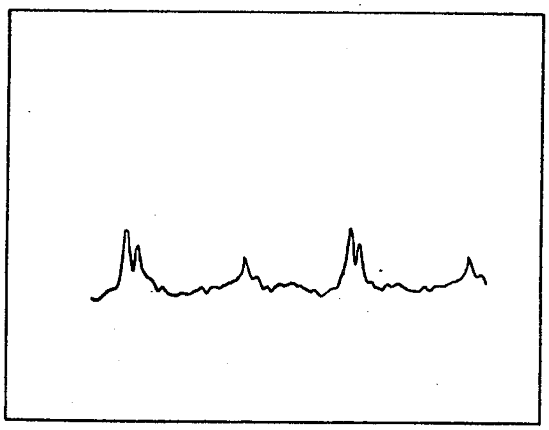
FIG. 2 shows the waveform of an electrical signal obtained by scanning a script letter "c."
Figure 3:
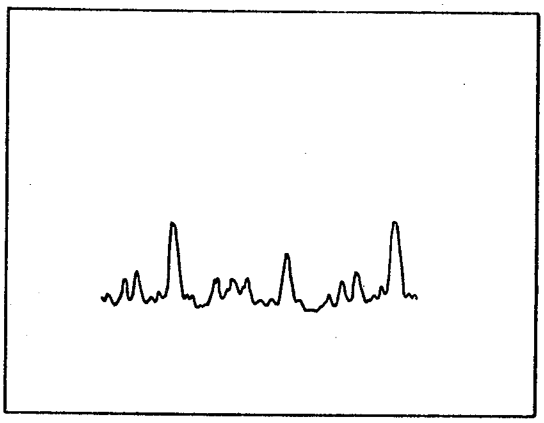
FIG. 3 shows the corresponding waveform obtained by scanning a fingerprint.

The scanning disc 10 is provided with two colinear radial slits 12 and is rotated continuously about its axis to scan the diffraction image circumferentially. The output of the detector 9 varies according to the integrated light intensity in the direction of the slits, and is thus determined by the edges in the pattern at right angles to the slits. By varying the radial length of the slits, they can be arranged to scan that part of the image produced by features of a given size range within the pattern. Continuous rotation of the slits results in a repetitive output waveform from the detector which is determined fundamentally by the pattern direction characteristics. FIGS. 2 and 3 show the waveforms obtained by scanning the images of a script letter "C" and a fingerprint respectively, with the form of slit shown in FIG. 1.

The use of two colinear radial slits rather than one, as in FIG. 1, is not essential and is made possible by the 180° symmetry of the image; it enables the detector to receive twice as much light as if a single slit were used, thus improving the signal-to-noise ratio. The center of the disc, being opaque, prevents transmission of light from the zero-order image.

Preferably the sides of the slits are radii of the disc as shown, rather than parallel-sided, so that the slit width diverges linearly towards the edge of the disc. Slits of this divergent shape make the derived frequency content substantially independent of the scale of magnification of the diffraction image. A suitable disc 10 has a radius of 1¾ inches, the opaque center being ¼inch in diameter and each slit 12 terminating ⅛inch from the edge of the disc. The sides of the slit lie on radii of the disc and subtend an angle of 0.01 radians, i.e. at a radius of 1 inch, the slit is 0.010 inch wide.

The waveform or signal resulting from the scan of the diffraction image can be processed by known data-handling techniques. It can be recorded, e.g. on magnetic tape, or transmitted by radio or cable; it can be compared, directly with other signals, e.g. held in a store, by known correlation techniques, or it can be subjected to frequency analysis.

The relative frequency content of the detector waveforms is characteristic of the pattern and can be used to provide a numerical classification code. The relative frequency content can be determined by feeding the waveform to a waveform analyzer 13 which can take various known forms. Preferably a Fourier analysis is made, the fundamental frequency being twice the frequency of revolution of the disc 10. In one arrangement the analyzer 13 comprises a plurality of filters tuned to pass the fundamental and the first several harmonics thereof. For example by using six such filters, the relative amplitude content of the fundamental and the first five harmonics can be determined. By determining these relative amplitudes to an accuracy of ±5 percent, each waveform can be classified by six decimal digits, allowing up to $10^6$ classes of fingerprint patterns to be established. Several fingerprint patterns may, of course, give the same frequency analysis and thus fall within the same class, depending on how fine a frequency analysis is undertaken. The use of more harmonics, e.g. ten, or a higher accuracy of estimation, gives correspondingly larger numbers of possible classes, and hence a correspondingly finer division of the patterns into classes.

A convenient rotation speed for disc 10 is 18 rev/sec., giving a fundamental frequency of 36 c/s and harmonics at 72 c/s, 108 c/s etc. up to 360 c/s for the tenth harmonic.

Using separate filters centered on each of these 10 frequencies, adequate discrimination, especially at the upper end of the spectrum, requires high Q circuits which are difficult to provide. It is therefore preferred to mix the signal from photomultiplier 8 with signals from ten fixed-frequency oscillators and to detect the difference signals. Each oscillator is set to a frequency only a few cycles different (e.g. 4 c/s) from one of the corresponding frequencies whose amplitude is to be determined, and is highly stable. The difference signals are fed to low-pass filters having cutoffs just higher than 4 c/s and the amplitudes of the outputs of these filters are proportional to the amplitudes of the corresponding frequency components.

Instead of rotating disc 12, the latter can be held stationary and the pattern 7 rotated.

FIG. 4 shows a form of scanning disc which gives the frequency content directly, without the need for subsequent analysis. In FIG. 4*a* the light transmission of disc 12′ varies sinusoidally around its circumference from a maximum on diameter 14 to a minimum on diameter 15. If such a disc, which can be produced by known photographic techniques, is rotated over the 180° symmetrical image, it can be shown that the photomultiplier output consists of an AC component having a frequency equal to that of the fundamental AC component of the waveforms (FIGS. 2 and 3) which would be obtained with the simple slits of FIG. 1, and an amplitude proportional to the amplitude of the latter waveform, plus a DC component corresponding to the other frequencies present in the latter waveform. Preferably the center 18 of the disc is again made opaque to eliminate light from the zero-order image. The amplitudes of the harmonics are obtained by using further discs whose light transmission varies sinusoidally around the circumference through a correspondingly increased number of cycles. For example FIG. 4 (*b*) shows a scanning disc for obtaining an AC component corresponding to the second harmonic. The fundamental frequency is again twice the frequency of revolution of the disc; for example if the discs are rotated at 18 rev/sec. the fundamental frequency is 36 c/s and the harmonics are 72 c/s, 108 c/s etc. By scanning the image successively with six such discs, AC outputs to give the aforementioned six decimal digits can be obtained. The form of disc shown in FIG. 4 also transmits more light than simple slits and thus improves the signal-to-noise ratio of the electrical signal.

In FIG. 5 the need to produce the transparency 5 of the fingerprint (FIG. 1) is eliminated by the substitution of a 45° right-angled prism 16 between lenses 4′ and 6′, which correspond in function to lenses 4 and 6 in FIG. 1. Normally the light from lens 4′ would be totally internally reflected at the hypotenuse face of the prism and deflected through 90° to lens 6′. If a finger 17 is pressed against the hypotenuse face, the contact of the skin ridges on the glass destroys the total internal reflection at the areas of contact and light is only reflected from the spaces between the ridges and around the fingerprint. Thus a pattern of the fingerprint is provided at the prism from which a diffraction image is produced as in FIG. 1. Conveniently a 45°—90°—45° prism is used as shown, but other configurations comprising a surface at which total internal reflection takes place can be employed.

Instead of using radial slits (as in FIG. 1) or discs having radially uniform transmission (as in FIG. 4) to effect a circumferential scan, it is possible to scan the image radially with an annular slit which is concentric with the diffraction image, the diameter of the slit being varied to effect the scan. Another form of radial scan uses a scanning member having a plurality of such annular slits through which the light from corresponding annular areas of the image is successively allowed to pass to effect the scan. Yet another form of radial scanning is effected by using a fixed annular slit and cyclically varying the effective magnification of the diffraction image. This can be done by a periodic axial movement of lens 8 disc 10 being moved in synchronism to keep the diffraction image focused in the plane of the disc). Alternatively it can be done by periodic axial movement of the transparency 5 in the divergent light beam preceding lens 4, or in the converging light beam following lens 6. In these ways an annular part of the image is effectively swept cyclically over the fixed slit. The information content of the signals obtained with radial scanning is however less than that obtainable with circumferential scanning. A combination of circumferential and radial scanning can also be used.

The signals obtained by scanning, or the numerical codings obtained by frequency analysis of the signals, are characteristic of the fingerprint or other pattern and can be compared by known data-processing techniques with the stored signals or numerical codes corresponding to other fingerprints or patterns to assist in identification.

With some patterns, it may be found that the distinguishing characteristics lie mainly in a particular portion or portions of the diffraction image, and hence that the discrimination between patterns is improved by scanning only that portion or portions. For example it is found that the most distinctive portions of the images produced by fingerprints tend to lie closer to the center of the image than to the circumference. Improved discrimination may thus be obtained by analyzing the frequency content of one or more narrow annuli of the image and classifying the print by the respective frequency content of such annuli, rather than by scanning the complete image in one operation.

FIG. 6 shows a form of scanning filter suitable for circumferential scanning of such narrow annuli. It comprises a disc 18 having collinear radial slits similar to that shown in FIG. 1, on which is superimposed a second opaque disc 20, having two sets of windows 21 lying on loci which spiral outwards from the center of the disc. Discs 18 and 20 are concentric and can be rotated relative to one another so that two windows 21 at a given radius coincide with slits 19 and 20 thus allow a corresponding annulus of the diffraction image to be scanned.

The two discs can be rotated continuously at slightly different speeds so that successive annuli of the image are scanned in turn, the frequency-analyzing apparatus being programmed to measure the frequency content of the successive annuli. Suitably the difference in rotational speeds may be about ¼r.p.m. at 18 rev/sec, this small difference being obtained by superimposing the difference speed on one disc by means of a differential gear train. Alternatively one disc may be indexed round in steps relative to the other to bring selected windows 21 into register with slits 19. Although FIG. 6 shows only seven windows per spiral, a larger number can be used to obtain a finer classification.

With such windows, the frequency content is no longer independent of the scale of magnification of the diffraction image, as with the divergent slits alone, but this may not be important where the patterns are of a standard scale, as with direct fingerprints.

FIG. 7 shows a further means for deriving characteristic information from selected annuli of the diffraction image. A disc 22 has an opaque center and successive annuli divided into alternate opaque and transparent zones. In the illustrated example the first (innermost) annulus 23 has one opaque and one transparent zone, the second annulus 24 has three opaque and three transparent zones, the third annulus 25 has five opaque and five transparent zones, the fourth annulus 26 has seven opaque and seven transparent zones, the fifth annulus (not shown) has eleven opaque and eleven transparent zones, etc. The transparent zones can be windows cut in an opaque disc. Disc 22 is superimposed on the diffraction image before scanning with an opaque disc 28 having a radial slit 29. Disc 22 is stationary relative to the image.

If it is assumed initially that the diffraction image is a uniformly illuminated area, it is apparent that the output waveform from the photomultiplier will contain components at a fundamental frequency arising from the scan of annulus 24 and at three, five, seven, eleven etc. times this fundamental frequency from the scan of the further annuli. These frequencies can be separated by a filtering technique as already described.

If now the uniformly illuminated image is replaced by an actual diffraction image in which the illumination is nonuniform, it is apparent that the amplitudes of the different harmonics will depend on the total amount of light in each of the several annular regions of the image on which disc 22 is superimposed. These relative amplitudes can be used to classify the patterns producing the images.

It will be noticed that the annuli of disc 22 contain different numbers of opaque zones, and that the actual numbers are the prime numbers one, three, five, seven, eleven, etc. The reason for choosing these numbers is to avoid confusion between the harmonics of the frequency arising from one annulus and the fundamental frequency of an annulus with a larger number of zones. If instead of using sharp-edged zones, a sinusoidal variation of transparency round each annulus is used (compare FIG. 4), so that there is no harmonic content, prime numbers of zones need not be used, although the different annuli must, of course, contain different numbers of zones. It is also necessary that diametrically opposite zones in a given annulus should have opposite characteristics, i.e. one should be opaque and the other transparent, in order to avoid loss of information from diametrically opposite portions of the symmetrical diffraction image.

FIG. 8 illustrates an arrangement in which mechanical scanning of the diffraction image is dispensed with, and an equivalent result obtained electronically. The diffraction image is projected on to a screen 26 comprising a plurality of equispaced photoelectric devices 27/1, 27/2, 27/3, 27/4, e.g. photodiodes or phototransistors, arranged in concentric circles. The devices 27 are thus in register with corresponding annuli of the diffraction image. The screen is divided into 16 equal sectors A-H and A-H′, each of which contains an equal number of the photoelectric devices in each ring, although the several rings need not contain equal numbers of devices.

The DC outputs from the devices 27 are fed to logic circuits which enable the outputs to be combined to produce net outputs corresponding to the amplitudes of selected harmonics of the spatial frequencies in selected annuli. For example to obtain an output corresponding to the amplitude of the fundamental frequency in the inner annulus shown, the outputs from those devices 27/1 located in sectors A, B, C, D of screen are added in adder A′ to the outputs from those devices 27/1 located in the diametrically opposite sectors A′, B′, C′, D′, and subtracted in difference network DN from the sum of the outputs from devices 27/1 in sectors E, F, G, H and E′, F′, G′, H′ which are added together by adder A2. To obtain an output an output corresponding to the first harmonic, the outputs from sectors A, B and A′, B′ are added to the outputs from sectors E, F and E′, F′; this total is then subtracted from the total obtained by adding the outputs from sectors C, D and C′, D′ and from sectors G, H and G′, H′. An output corresponding to the second harmonic is obtained by subtracting the sum from sectors A and A′, C and C′, E and E′, G and G′ from the sum from sectors B and B′, D and D′, F and F′ and H and H′.

Corresponding outputs can be obtained from devices 27/2, 27/3 or 27/4 in register with other annuli of the image, from combinations of annuli, or from all the devices in a given sector or number of sectors, leading to great flexibility in characterizing patterns by the frequency content of selected annular portions of their diffraction images.

The above-described arrangement amounts, in effect, to a static form of circumferential scanning. It is similarly possible to effect the static equivalent of radial scanning by summing the outputs of all the devices in selected annuli. It will be appreciated that the optical system for the static scanning arrangement of FIG. 10 will be similar to that of FIG. 1 with the scanning disc eliminated.

Although in the described embodiments the collimated light is coherent, and this is preferred, coherence is not essential to the present invention and suitable, though different, diffraction images can be produced using a collimated noncoherent light beam.

I claim:

1. Apparatus for pattern classification comprising means for providing a beam of collimated light, means for locating a pattern relative to said beam to produce a diffraction image from said pattern, a plurality of rings of photosensitive devices positioned to receive said diffraction image thereupon with the rings concentric with the axis along which the image is projected, and means for combining outputs from the devices in selected sectors of said rings to produce an output corresponding to the amplitude of at least one selected spatial frequency in the annular portion of the image which is superimposed on one of said rings.

2. Apparatus as claimed in claim 1, wherein said pattern is a transparency.